Sept. 28, 1965  J. GILLOIS ETAL  3,208,086
MOBILE AND AMPHIBIOUS BRIDGE UNITS
Filed Feb. 23, 1962  7 Sheets-Sheet 1

INVENTORS
Jean Gillois and
Hermann Walter GEHLEN

BY Robert H Jacob

AGT.

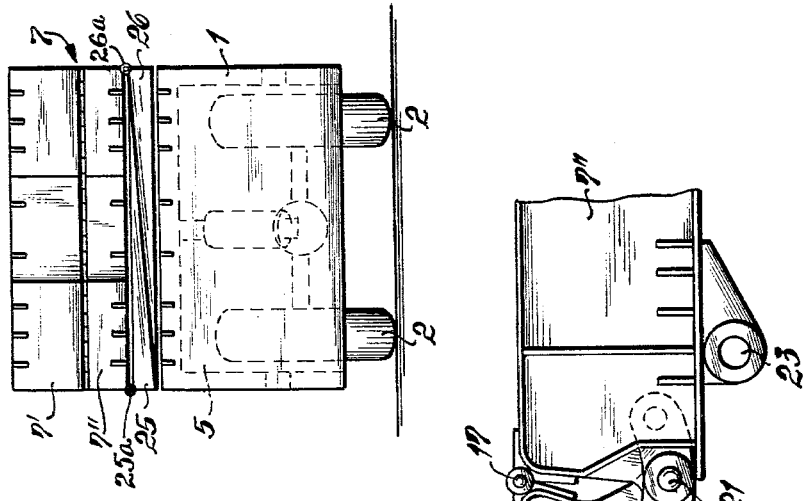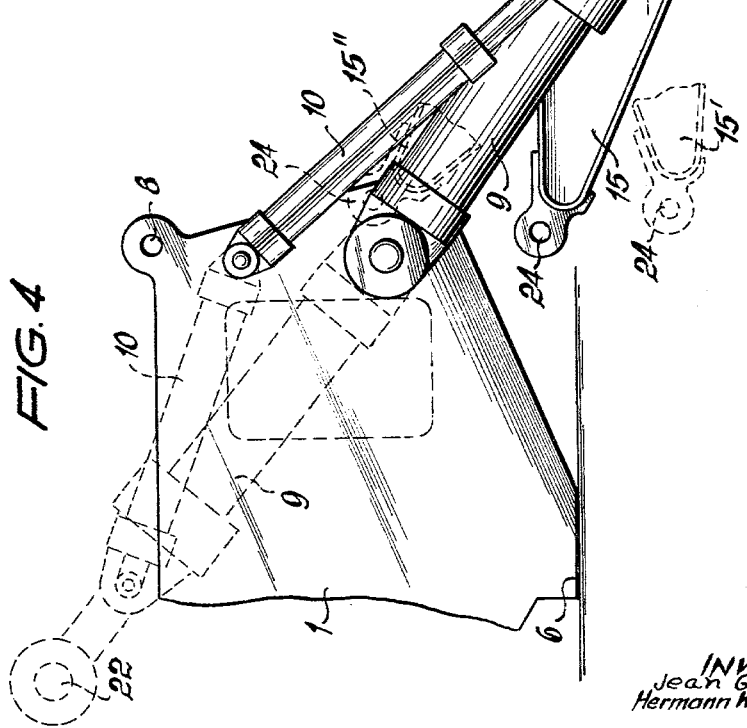

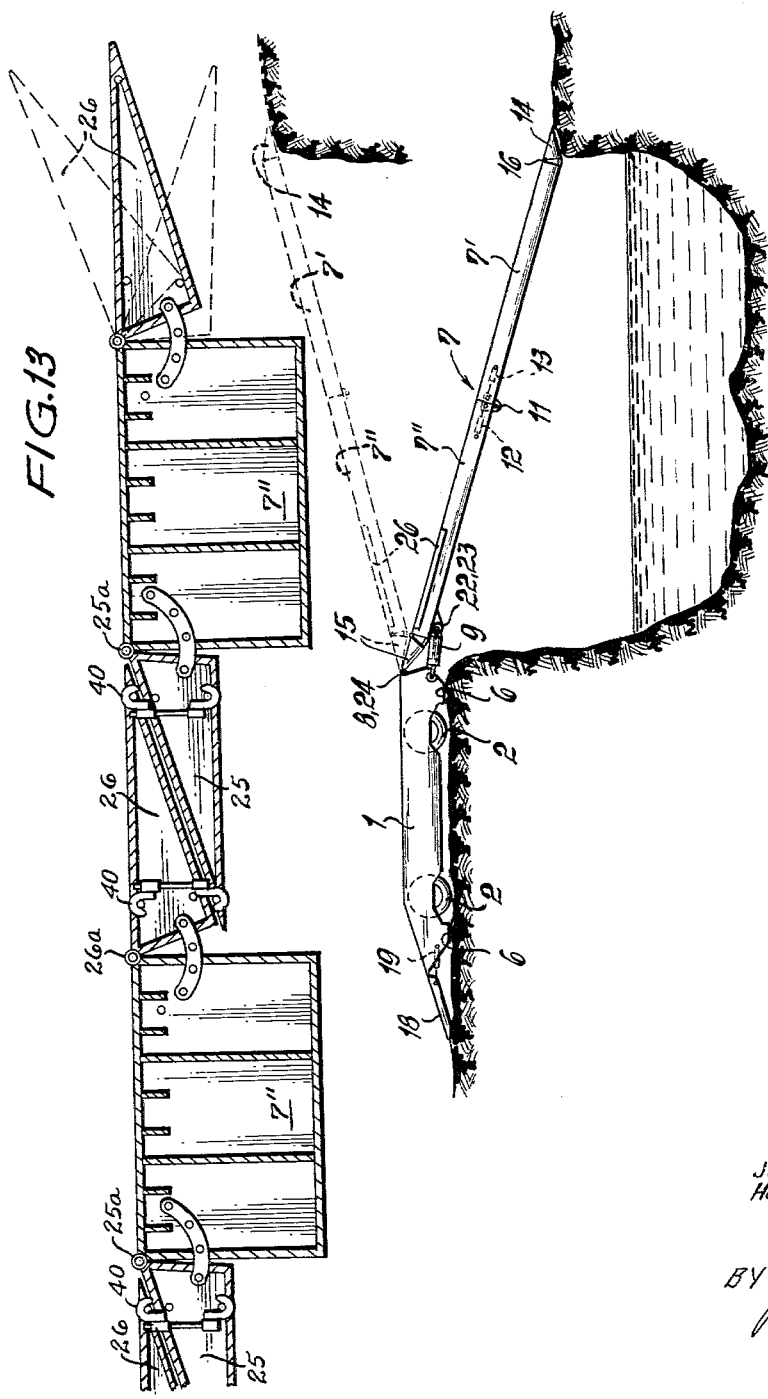

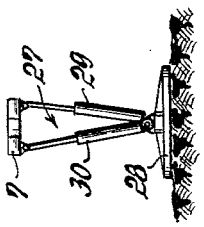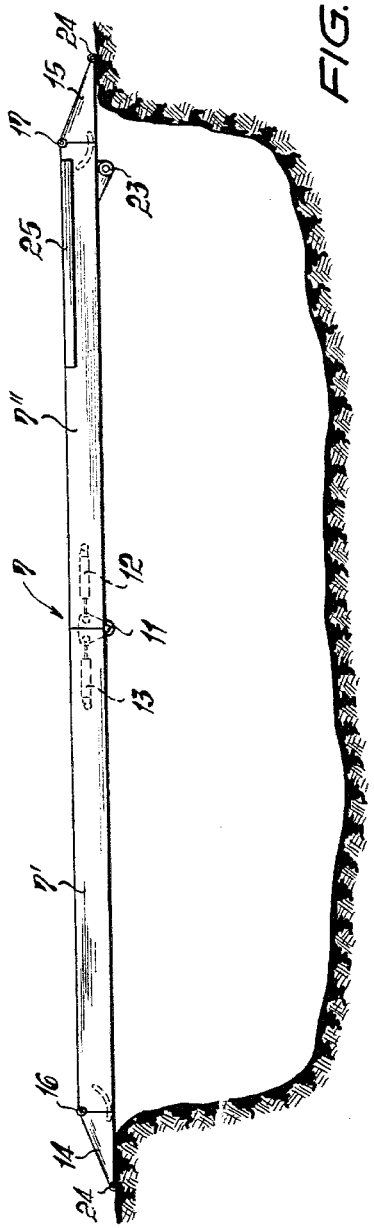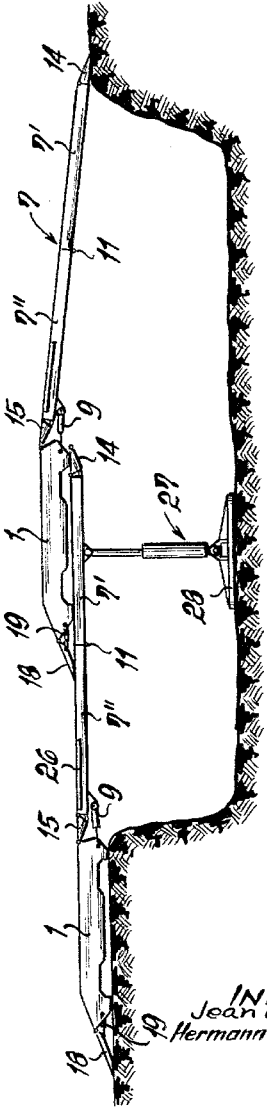

Sept. 28, 1965 J. GILLOIS ETAL 3,208,086
MOBILE AND AMPHIBIOUS BRIDGE UNITS
Filed Feb. 23, 1962 7 Sheets-Sheet 5
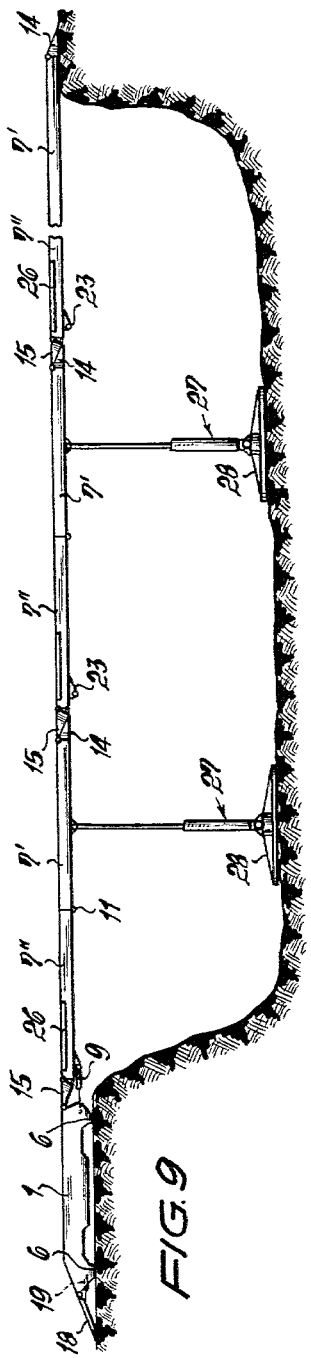
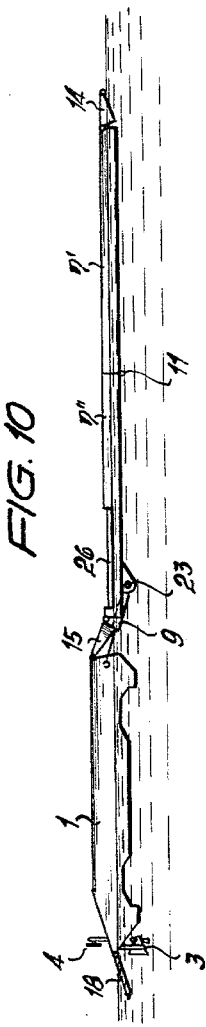
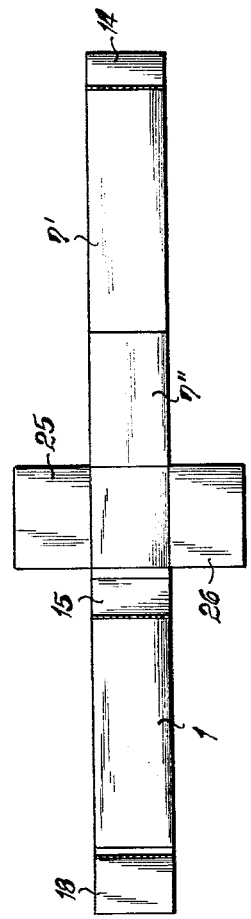
INVENTORS
Jean Gillois and
Hermann Wolter GEHLEN
BY Robert H. Jacob
AGT.

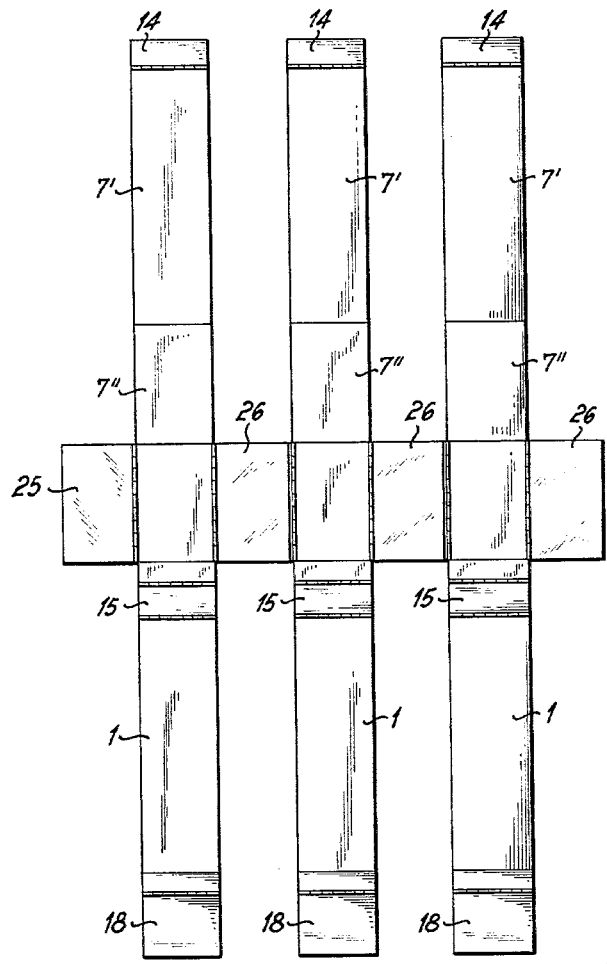

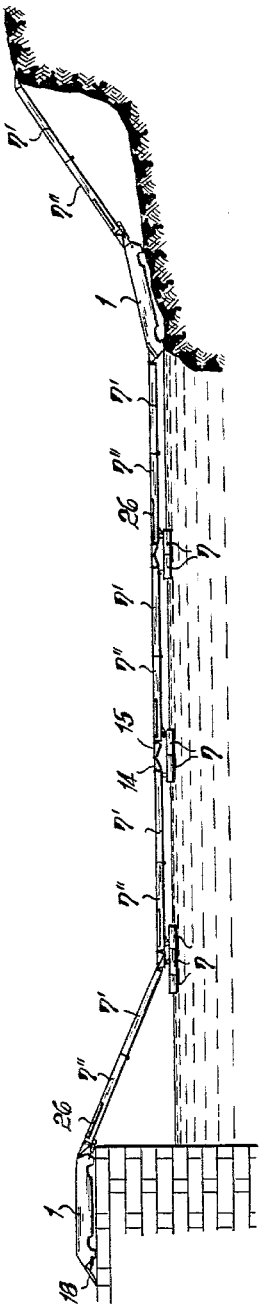
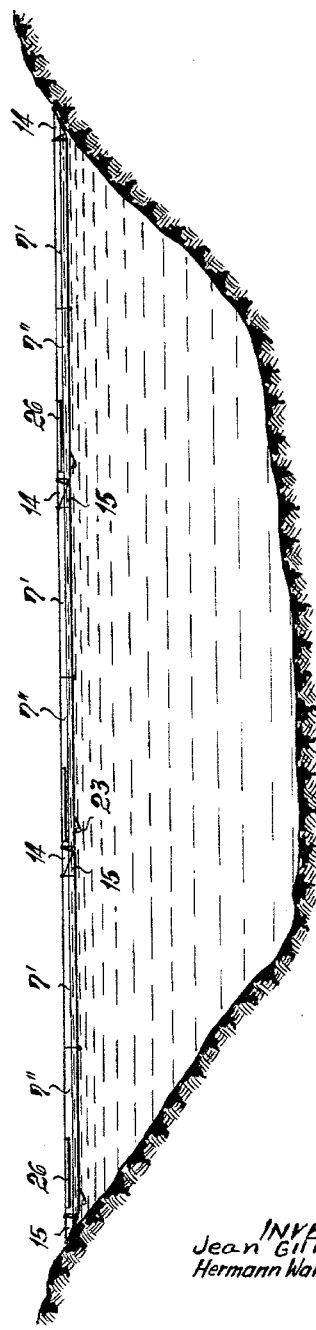

United States Patent Office 3,208,086
Patented Sept. 28, 1965

3,208,086
MOBILE AND AMPHIBIOUS BRIDGE UNITS
Jean Giilois, Westring 10, Rastatt, Germany, and Hermann Walter Gehlen, Pirmasenser Strasse 60, Kaiserslautern, Pfalz, Germany
Filed Feb. 23, 1962, Ser. No. 175,245
Claims priority, application Germany, Feb. 23, 1961, G 31,672
5 Claims. (Cl. 14—1)

The invention relates to mobile bridges and is primarily concerned with amphibious and mobile bridge units. More in particular, the invention is concerned with improvements in mobile self-propelled bridge units of the type covered by applicants' U.S. Patent No. 3,010,128.

The mobile bridge units described in the aforesaid U.S. patent comprise a main portion in the form of a vehicle body which is adapted to float and is provided with retractable wheel axles for land travel to the location where the bridge unit is used. These units are provided with a power plant for driving the wheels as well as operating any other movable components which from part of the unit. The bodies are provided at the ends with ramps which are pivotally movable by hydraulically operated gear such as pistons or the like, and during transportation the ramps are folded over onto the main body of the vehicle. While in use, they form together with the main body with which they are rigidly connected a bridge unit having a continuous road bed.

The ramps in accordance with the patented structure are preferably of different lengths, and where the length of the ramps is considerable, they can be folded transversely of the longitudinal axis for purposes of transportation.

It has now been found that in order to impart greater utility to the bridge, the ramps should be given a special form so that one ramp which is mounted at one end of the body constitutes an essential bridge member having twice the length of the vehicle body, while the other ramp mounted at the other end of the vehicle is pivotally mounted at that end which is inclined and defines a short ramp portion.

The main ramp which constitutes a bridge member may furthermore be equipped with two pivotally mounted and pointed end portions for better adapting the ramp to the different conditions of use. Finally, the main ramp which serves as a bridge member may be arranged to be removable so that it can independently fulfill the purposes of the bridge.

In order to attain greater spans, the vehicle may also be equipped with additional supports which are introduced for supporting bridges formed by a plurality of vehicles and ramps or by a plurality of ramps alone.

Finally, in order to improve the floating capacity of the vehicle, it is an essential object of the invention that the main ramp which constitutes a substantial portion of the bridge is adapted to float, in that it is made in the form of a buoyant closed hollow body.

The main ramp may also be provided with ramps that may be unfolded laterally, and that particularly in the proximity of the pivot joint where the main ramp is connected with the body. The short ramps are used advantageously as lateral stabilizers in the event that a single vehicle travels as an independent unit on water.

By means of the proposed supplemental measures of improvement, it is possible to adapt the mobile bridge unit in accordance with the aforementioned patent to very extensive and universal use. With the vehicle constructed in this manner, it is possible in practice to form bridges to span depressions in the surface of the ground, such as gulches, small waterways or the like. Without employing the buoyancy of the individual bridge members the vehicle can be utilized either alone or in combination with several vehicles of the same type as a ferry or also as a floating bridge. Finally it should be mentioned that by suitably determining the dimensions of the bridge which are initially determined by its load carrying capacity in action, the bridge can also be adapted for air transportation. At any rate, the vehicle constitutes an autonomous or self-sufficient unit which can be utilized without auxiliary means on land and in the water. Owing the possibility of removing the large ramp from the vehicle body, it is possible to deploy the ramp alone in the manner of a conventional bridge runway either as a solid supporting or girder bridge as well as a floating bridge.

At the inclined end of the buoyant vehicle body where the short approach ramp is pivotally mounted, a propeller drive for water travel which is pivotally mounted and movable into operative position is provided as well as a retractable or sinkable steering desk or station or steering the drive means.

For the purpose of forming larger units composed of several of the vehicles in accordance with the invention, the side walls are provided with latching means.

The body of the vehicle, which is in the form of a pontoon, can be provided at the lower portion of the opposite ends with support plates which when the vehicle is used on land absorb the surface pressure together with the wheels in retracted condition.

For the operation of the larger ramp a large operating cylinder is provided which cooperates with two other operating cylinders. The projected pivot axes of the two further operating cylinders make it possible when the ramps are swung out to overcome the dead point of the ramp, no matter whether the center of gravity of the ramp is displaced at the same time.

The large operating cylinder is provided with control means in such a manner that the connection between the vehicle body and the ramp can be obtained in the form of a totally rigid, semi-rigid, or loose joint, depending on the operating conditions at any particular time.

Further features of the invention and details of the advantages obtained thereby will become apparent from the following specification with reference to the accompanying drawings, which show the assembled vehicle as well as details and in particular the extremely manifold possibilities of use.

FIG. 3 is a section through the vehicle in the area of the forward road traveling means, FIG. 4 is a detail of the construction of the hydraulic cylinders for pivotal movement and also depositing or setting down the main ramp, FIG. 5 illustrates the bridge in use for spanning a small body of water, FIG. 6 shows the ramp deposited as a bridge, FIG. 7 shows the manner in which a bridge may be formed by the use of the two vehicles and a support, FIG. 8 is a detail of the bridge support, FIG. 9 illustrates the construction of a bridge by means of several ramps and supports, FIG. 10 is a side view of the vehicle employed as a single ferry, FIG. 11 is a top view of FIG. 10, FIG. 12 illustrates in plan view a ferry constituted of of three individual vehicles.

FIG. 13 illustrates the manner in which the vehicles in FIG. 12 are held together, FIG. 14 illustrates a bridge formed of set down ramps where the bank sections are constituted by complete vehicle bodies, FIG. 15 illustrates a bridge defined by longitudinally aligned and coupled floating ramps.

Figure 1:
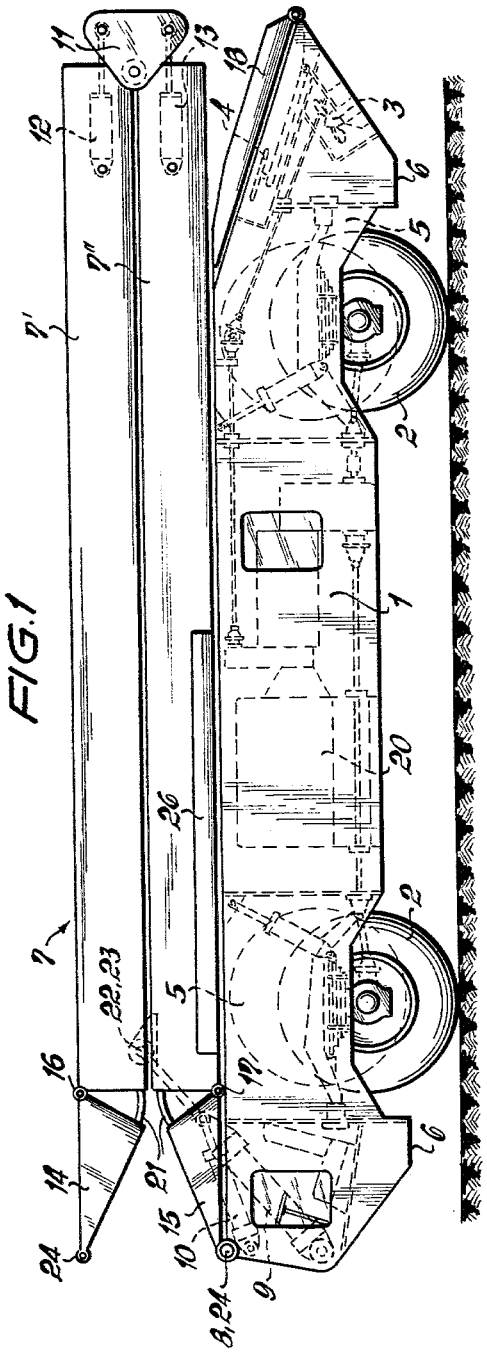
FIG. 1 shows a side view of the bridge vehicle in road travel condition.
Figure 2:
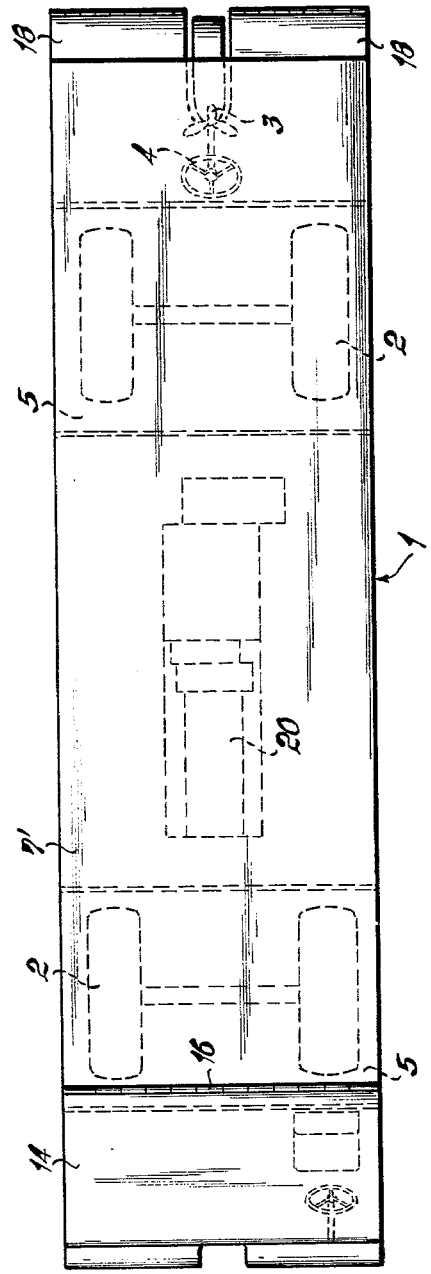
FIG. 2 is a top view of the vehicle in accordance with FIG. 1.

Different overall views of the mobile bridge unit in accordance with the invention are shown in FIGS. 1 to 3. The vehicle body proper is constructed as a hollow casing in the form of a pontoon haivng a very large carrying surface on the water. This vehicle body 1 has retractable running wheels 2 for driving on land and a retractable rudder propeller 3 for propulsion on water, while for steering on the water a steering desk 4 is provided which can be folded over onto the deck. The actual driver's station is installed at the front end of the vehicle and is of conventional construction.

The housings 5 into which the wheels 2 are retractable are hermetically closed at the top in a known manner and may be supplied with compressed air in order to increase the carrying capacity of the pontoon.

In the region of the ends, the pontoon 1 is provided with supporting plates 6 which, together with the retractable wheels, provide for better distribution of the surface pressure when the vehicle is set down.

At the forward end of the pontoon a large ramp 7 which is divided into two parts is pivotally connected, each of the two halves of which extends over the entire length of the vehicle. The ramp 7 is linked to the vehicle body 1 at 8 by interlocking bolts so that the ramp 7 can be readily set down or picked up.

The ramp 7 is pivotally moved by means of a large cylinder 9, the operation of which is combined with that of two additional operating cylinders 10. These two operating cylinders 10 make it possible by virtue of the fact that their axes of rotation are displaced with respect to the axis of rotation of cylinder 9 to readily overcome the dead point as the ramp 7 is unfolded, no matter whether or not the center of gravity of the ramp is displaced.

By means of these cylinders 9 and 10 the large ramp 7 can be deposited and picked up on land or on the water without additional lifting apparatus.

The two ramp portions 7', 7" of the large ramp 7 are connected by means of a pivot joint 11 and by two further hydraulic cylinders 12 and 13 which complete the connection between the pivot joint 11 and the two ramp portions 7' and 7".

The two ends of the ramp 7 are constructed in the form of end pivot members 14 and 15 which are mounted for pivotal movement about joints 16 and 17 on the actual ramp 7.

It is possible by means of the large cylinder 9 to construct the connection between the pontoon-like vehicle body 1 and the ramp 7 as a rigid joint, a semi-rigid joint, or as a loose joint, depending on the conditions of use and installation at any particular time.

The ramp 7 defined by the two halves 7' and 7" is in the form of buoyant hollow casings.

The two end members 14, 15 of the ramp portions 7', 7" may be latched or locked in different positions with respect to the ramp portions 7' and 7".

Besides the large ramp 7 the pontoon-like vehicle body 1 is provided at its rear end with a small approach ramp 18 which may preferably be folded onto the inclined rear end of the pontoon 1 below ramp 7. Also the ramp 18 may be fixed in any desired position by means of a hydraulic cylinder 19 which serves to raise and lower this ramp.

FIGS. 1 and 2 also indicate the position of the power plant 20 for the mobile bridge unit.

Details of the construction of the hydraulic group of cylinders for swinging, depositing and picking up the large ramp 7 are illustrated in FIG. 4. By way of example, the pontoon shaped vehicle body 1 is set down on the ground proximate the bank of a body of water. The support plates 6 as well as the retracted wheels 2, which are not shown in this illustration, are seated on the surface of the ground. The ramp 7, of which only one ramp half 7" is shown, is disconnected. The ramp end portion 15 is swung about the pivot joint 17 and fixed into position at 21 so that the surfaces of the ramp 7 and of the end member 15 are disposed in a plane. Further possible positions of the end member 15 are indicated in dashed lines at 15' and 15".

The cylinders 9 and 10 are shown in solid lines in the extended and downwardly swung position, in dashed lines in their retracted and folded over position, while the position of an end portion of the piston of cylinder 9 which is provided with an eyelet 22 is only indicated in dashed lines to provide for greater clarity in the drawings. This eyelet is connected with the eyelet 23 provided on the ramp portion 7" for the conditions where the ramp 7 is not disconnected and particularly for the pivotal movements the ramp is required to make. In that event the eyelet 24 is pivotally connected to the end member 15 of the ramp 7 at the joint 8.

If the ramp is not to be disconnected, then it can be positioned at any desired angle during water travel of the vehicle to attain optimum carrying capacity with respect to the vehicle body 1. It is also possible in this manner to provide for the rudder propeller 3 to dip more or less deeply into the water.

While the vehicle travels on water, the unfolded ramp, of course, improves the traveling conditions, particularly its buoyancy.

The ramp 7, preferably the ramp half 7", may additionally be provided with unfoldable ramps 25 and 26 which are likewise pivotally swingable by means of hydraulic cylinders and may, besides other purposes, serve preferably as lateral stabilizers during the travel on water, especially when a single mobile bridge unit is used alone. As illustrated in FIG. 3 the folding ramps 25 and 26 are supported by hinge means 25a and 26a, respectively, along outer opposite longitudinal edges of ramp half 7".

The vehicle bodies are provided laterally thereof and the ramps at the ends thereof with connecting means which permit combining and joining individual units into larger units, as explained hereinafter with reference to additional figures of the drawings.

FIG. 5 illustrates the manner in which the mobile bridge unit in accordance with the invention can be employed for bridging a relatively small body of water or any other depression in the earth surface. The pontoon shaped vehicle body 1 is set down for this purpose and seated with its retracted wheels 2 and the support plates 6 on the surface of the ground. The ramp 7 is unfolded and rests on the opposite bank with its end member 14. The entire bridge construction thus formed is constituted as a longitudinally rigid bridge by locking the cylinders 9, 12, 13 and 19.

If the opposite bank is higher than the shore on which the vehicle is set down, the ramp assumes approximately a position such as indicated in dashed lines in FIG. 5. The adaptation of the ramp to the different positions of support for different angular positions of the ramp can be effected by pivotally moving and latching the end member 14 and/or also the end member 15.

As already mentioned, the ramp may also be set down and then serve as an independent bridge unit which is no longer movable for spanning any particular depressions in the surface of the terrain, waterways and the like, while meanwhile the vehicle proper may be deployed without a ramp, for example as an amphibious bridge construction boat or the like. Such a possibility of utilizing the ramp without the vehicle is illustrated in FIG. 6. The ramp has been disconnected, and its parts 7' and 7" and their end members 14 and 15 bridge a depression in the terrain. The entire ramp constitutes a rigid bridge girder.

In order to overcome greater obstacles and to constitute greater spans the vehicle may also be equipped with auxiliary supports or props 27 which may be utilized for supporting bridges formed by a plurality of vehicles or by a plurality of ramps. FIG. 7 illustrates such a support or prop 27 particularly in combination with two complete vehicles. FIG. 8 is an illustration in front view of such a support 27. This support may comprise a ground plate 28 and two struts 29 and 30 which extend therefrom in V-shape and may be adjusted as to length, and upon the upper end of which the ramp 7 of the vehicle in accordance with the invention is supported.

FIG. 7 as well as the subsequent figures of the drawings that illustrate the possibilities of use or deployment of the vehicles in accordance with the invention show the vehicle only schematically.

FIG. 9 illustrates the manner of connecting a plurality of ramps with one another to obtain a relatively long bridge in combination with the auxiliary pillars or piers 27 while only one vehicle body remains in use as an approach ramp, while the remaining part of the bridge consists of ramps that have been connected to one another.

The vehicle body 1 is again set down, and its short ramp 18 serves as the approach ramp. Its ramp 7 with the ramp halves 7″ and 7′ extends out over the obstacle to be bridged and is supported by means of a pier 27.

The connection of the individual further ramps with this ramp and among one another is effected by way of the end members 14 and 15 which, as illustrated, are longitudinally of triangular section and are provided with connecting eyelets. The end members 14 and 15 of two abutting ramps 7 thus constitute a connecting portion between the individual ramp portions 7″ and 7′ which completely fills the cross section of the girder longitudinally thereof. In this manner obstacles of any particular width may be spanned.

FIGS. 10 to 13 illustrate the vehicle in accordance with the invention in use as a ferry. In FIG. 10 it is employed as a single ferry. The ferry comprises only a single mobile vehicle in accordance with the invention as shown in FIGS. 10 and 11, where in order to improve the carrying capacity, not only the pontoon shaped vehicle body 1 but also the ramp 7 with the ramp halves 7′ and 7″ are utilized. The rudder propeller 3 and the steering panel 4 are unfolded for the travel on water. The cylinder 9 and the end member 15 permit of adjusting the relative position of the ramp 7 with respect to the vehicle 1. The ramps 25 and 26 are unfolded and increase the stability laterally of the ferry. The ramp 18 and the end member 14 permit the vehicle to be adapted to any existing angular conditions of the banks or shores where the vehicle is located for loading and unloading.

It is also possible in order to transport heavy individual loads to combine the vehicles in accordance with the invention in any other manner, for example the vehicle bodies can be disposed directly alongside one another, so that only the outer ramp along the free side of each vehicle on the outside of the joined vehicle is unfolded.

A floating bridge can be assembled from individual vehicles in a manner that the vehicle bodies 1 and ramps 7 are disposed in the direction of the stream of the water. The bridge road surface is then formed by the unfolded ramp portions 25, 26 and the areas of the ramp halves 7″ associated therewith. As shown in FIG. 13 the unfolded overlapping ramps 26, 25 are held together securely by cramp irons 40, although any other well known clamping means may be used.

In the vicinity of the banks or shores the two heads of the bridge may, if desired, be formed of three vehicles disposed adjacent to one another. Over the remaining length the bridge is composed of vehicles which are connected with one another by the unfolded ramp portions 25 and 26. Owing to the fact that the latter are of triangular longitudinal section, they provide for the ramp portions being placed one over the other and connected with one another to form a box girder of rectangular cross section and corresponding supporting characteristics. In this manner floating bridges of any desirable length may be set up by the use of a single type of vehicle without additional bridge head vehicles or auxiliary means on the vehicles which at the shore form the two bridge ends. The last laterally pivotally movable ramps 25 and 26 at the ends can be used to adapt the bridge to any desired incline of the shore.

It is also possible to form a complete floating bridge by means of the disconnected ramps alone in a manner that with particularly difficult shore conditions the bank portions can be constituted by complete vehicles by means of the ramp connected thereto.

Thus in FIG. 14 a river bridge construction is illustrated where the actual floating bridge is formed by the disconnected ramps. Here the ramps form the floating bodies as well as also the bridge surface. They are in the form of floating bodies arranged in the direction of the flow of the stream and support the joined ends of the individual ramp sections that constitute the bridge track or surface. Depending on the requirements, they may be formed of a plurality of ramps connected as shown in FIG. 14.

The shore portions, for example as illustrated in FIG. 14, may be formed by additional vehicles. Such a combination can also be adapted to follow any fluctuations in the water level of the body of water to be bridged.

For less severe requirements as to carrying capacity of the bridge, it is also possible to connect the ramp sections longitudinally as illustrated in FIG. 15. The ends of the entire bridge are then formed by ramp members 15 and 14. Throughout the extent of the bridge these end members are placed on top of one another so that the rectangular profile of the bridge is continued throughout the length of the bridge.

The vehicles in accordance with the invention can also be employed for bridging a swamp area. The vehicles are set down in the non-carrying territory until they either reach supporting ground or until their buoyancy becomes effective.

Furthermore, the vehicle may be used as a loading means for loading and unloading a transport train. For this purpose a vehicle is driven to the end of a transport train formed of flat cars and serves as the approach ramp over which any kind of vehicles may be driven onto the train.

It is furthermore possible to utilize the vehicle in accordance with the invention for loading and unloading transport ships or vessels, particularly to span the relatively great distance involved by most conditions of shore formation. Furthermore, it is possible to compensate for the conditions arising as a result of the differences in water level caused by the tides at the sea shore.

The vehicle body is set down on the shore, while the ramp 7 reaches with its ramp halves 7′ and 7″ and the end members 14 and 15 over the slope of the shore, which cannot be negotiated either by land or from the water, onto the deck of a transport vessel 32 which is loaded with vehicles 33. The possibility is also provided of compensating for the different water level conditions.

The same situation also arises in connection with the use of the vehicle as the shore portion of a floating bridge with changing water level. The floating bridge is formed by conventional bridge vehicle units having floating bodies with bridge tracks that are pivotally mounted thereon and which may be furthermore equipped with additional lateral floating bodies. If the high water level should result in the distance between the end of the bridge and the banks being too close so that the pivotal movement of the ramp members 14 is insufficient for completing the surface track, it is possible to insert a wedge between the ramp halves 7″ and 7′ in the upper girder as a cover plate, so that also here all possible conditions are taken into consideration.

Having now described our invention with reference to the embodiments illustrated in the drawings, we do not wish to be limited thereto, but what we desire to protect by Letters Patent of the United States is set forth in the appended claims.

We claim:

1. A mobile and amphibious bridge unit of the type comprising a buoyant vehicle body equipped with retractable wheels, a power plant, ramps pivotally supported at the ends of said body and means connected intermediate said ramps and said body operative to move said ramps angularly into extended operative positions and into positions of rest on said body, said body having a flat top over the major portion of its length with a downwardly inclined portion at one end, one said ramp being a main ramp pivoted at the end of said flat top opposite said inclined portion, said main ramp being substantially twice the length of said vehicle body and being formed in two hinged sections to be folded when at rest on said flat top with the hinge between sections overhanging said inclined portion, the other said ramp lying on said inclined portion when at rest and having a pivot connection with said body below the hinge between the sections of said main ramp when said ramp is at rest on said body.

2. A mobile and amphibious bridge unit of the type comprising a buoyant vehicle body equipped with retractable wheels, a power plant, ramps pivotally supported at the ends of said body and means connected intermediate said ramps and said body operative to move said ramps angularly into extended operative positions and into positions of rest on said body, said body having a flat top over the major portion of its length with a downwardly inclined portion at one end, one said ramp being a main ramp pivoted at the end of said flat top opposite said inclined portion, said main ramp being substantially twice the length of said vehicle body and being formed in two hinged sections to be folded when at rest on said flat top with the hinge between sections overhanging said inclined portion, the other said ramp lying on said inclined portion when at rest and having a pivot connection with said body below the hinge between the sections of said main ramp when said ramp is at rest on said body, and each said section of said main ramp having at the end thereof remote from said hinge a horizontal axis supporting an end member mounted for pivotal movement about said axis and tapering in thickness in the direction away from said axis.

3. A mobile and amphibious bridge unit of the type comprising a buoyant vehicle body equipped with retractable wheels, a power plant, ramps pivotally supported at the ends of said body and means connected intermediate said ramps and said body operative to move said ramps angularly into extended operative positions and into positions of rest on said body, said body having a flat top over the major portion of its length with a downwardly inclined portion at one end, one said ramp being a main ramp pivoted at the end of said flat top opposite said inclined portion, said main ramp being substantially twice the length of said vehicle body and being formed in two hinged sections to be folded when at rest on said flat top with the hinge between sections overhanging said inclined portion, the other said ramp lying on said inclined portion when at rest and having a pivot connection with said body below the hinge between the sections of said main ramp when said ramp is at rest on said body, and said sections of said main ramp being in the form of buoyant hollow bodies.

4. A mobile and amphibious bridge unit of the type comprising a buoyant vehicle body equipped with retractable wheels, a power plant, ramps pivotally supported at the ends of said body and means connected intermediate said ramps and said body operative to move said ramps angularly into extended operative positions and into positions of rest on said body, said body having a flat top over the major portion of its length with a downwardly inclined portion at one end, one said ramp being a main ramp pivoted at the end of said flat top opposite said inclined portion, said main ramp being substantially twice the length of said vehicle body and being formed in two hinged sections to be folded when at rest on said flat top with the hinge between sections overhanging said inclined portion, the other said ramp lying on said inclined portion when at rest and having a pivot connection with said body below the hinge between the sections of said main ramp when said ramp is at rest on said body, and said sections of said main ramp being in the form of buoyant hollow bodies, and one of said sections having laterally unfoldable auxiliary ramps pivotally mounted on said section proximate the end thereof which is supported on said body, said auxiliary ramps being supported by hinge means on oppositely disposed longitudinal edges of said one ramp section and being triangular in cross section in a manner to define a box girder of rectangular section with two auxiliary ramps having each one side plane adjacent a side plane of the other.

5. A mobile and amphibious bridge unit of the type comprising a buoyant vehicle body equipped with retractable wheels, a power plant, ramps pivotally supported at the ends of said body and means connected intermediate said ramps and said body operative to move said ramps angularly into extended operative positions and into positions of rest on said body, said body having a flat top over the major portion of its length with a downwardly inclined portion at one end, one said ramp being a main ramp pivoted at the end of said flat top opposite said inclined portion, said main ramp being substantially twice the length of said vehicle body and being formed in two hinged sections to be folded when at rest on said flat top with the hinge between sections overhanging said inclined portion, the other said ramp lying on said inclined portion when at rest and having a pivot connection with said body below the hinge between the sections of said main ramp when said ramp is at rest on said body, and each said section of said main ramp having at the end thereof remote from said hinge a horizontal axis supporting an end member mounted for pivotal movement about said axis and tapering in thickness in the direction away from said axis, and one of said sections having laterally unfoldable auxiliary ramps pivotally mounted on said section proximate the end thereof which is supported on said body, said auxiliary ramps being supported by hinge means on oppositely disposed longitudinal edges of said one ramp section and being triangular in cross section in a manner to define a box girder of rectangular section with two auxiliary ramps having each one side plane adjacent a side plane of the other.

References Cited by the Examiner

UNITED STATES PATENTS

| 1,447,893 | 3/23 | Roy. | |
|---|---|---|---|
| 2,321,677 | 6/43 | Higgins | 14—27 |
| 2,556,175 | 6/51 | Frost | 14—1 |
| 2,579,605 | 12/51 | Odot | 14—27 |
| 2,636,197 | 4/53 | Odot | 14—27 |
| 2,670,484 | 3/54 | Bintliff | 14—72 |
| 3,010,128 | 11/61 | Gillois | 14—1 |

FOREIGN PATENTS 826,283  12/59  Great Britain.

JACOB L. NACKENOFF, *Primary Examiner.*